United States Patent [19]

Hedderick et al.

[11] Patent Number: 4,818,444
[45] Date of Patent: Apr. 4, 1989

[54] FLUID PRESSURE CONTROL VALVE AND A SYSTEM WHICH INCLUDES SUCH A VALVE

[75] Inventors: John B. Hedderick, Middlesex; Brian R. Rutty, Addlestone; John J. Walshe, Minety, all of Great Britain

[73] Assignee: Arthur Guinness Son and Company (Great Britain) Limited, Great Britain

[21] Appl. No.: 187,273

[22] Filed: Apr. 28, 1988

[30] Foreign Application Priority Data

May 1, 1987 [GB] United Kingdom ............. 8710367

[51] Int. Cl.$^4$ ............................................ G05D 11/03
[52] U.S. Cl. ....................................... 261/30; 137/98; 137/468; 137/529; 137/530; 236/92 R; 261/64.3; 261/39.1
[58] Field of Search ............... 137/98, 100, 468, 529, 137/530; 261/30, 64.3, 39.1; 236/92 R

[56] References Cited

U.S. PATENT DOCUMENTS

| 2,780,412 | 2/1957 | Holley | 137/98 X |
| 2,944,564 | 7/1960 | Pettey | 137/529 |
| 4,189,095 | 2/1980 | Monigold et al. | 137/529 X |
| 4,336,903 | 6/1982 | Zirps | 236/92 R |
| 4,549,563 | 9/1985 | Monnier | 137/100 |
| 4,560,104 | 12/1985 | Nagumo et al. | 236/92 R X |

FOREIGN PATENT DOCUMENTS

| 962875 | 9/1982 | U.S.S.R. | 137/98 |
| 2172265 | 9/1986 | United Kingdom . | |
| 2172260 | 9/1986 | United Kingdom . | |

Primary Examiner—Stephen Hepperle
Attorney, Agent, or Firm—McCormick, Paulding & Huber

[57] ABSTRACT

A fluid pressure control valve and a fluid control system (such as for beverage dispensing) with such a valve has a beverage passage 3, pressure fluctuations in which are detected by a diaphragm 17 to displace a sensing member 15 axially against spring loading 23. Spring 23 reacts on thrust member 22 which is adjustable axially through a cam mechanism 25/26 to vary the biasing force of spring 23. A valve member 20 spring loaded at 21 relative to thrust member 15 normally closes an exhaust port 19 to an air or other gas passage 5 through which gas passes under pressure to be injected into the beverage from passage 3. An increase in beverage pressure in passage 3 displaces sensing member 15 to increase the spring biasing 21 on the closure member 20 and reduce the proportion of air which can escape to atmosphere from passage 5 through exhaust port 19 to provide an increase in air flow into the beverage. A reduction of pressure in passage 3 reduces the spring biasing 21 to permit a greater proportion of air to escape from passage 5 through exhaust port 9 and thereby reduce the proportion of air which is introduced into the beverage. The control valve can include a temperature sensitive unit responsive to temperature of beverage in passage 3 and which reacts to adjust the force of biasing spring 21 independently of pressure in the passage 3. Plunger 51 can be depressed manually to close the exhaust port 19 temporarily and thereby maintain maximum air pressure in the passage 5.

26 Claims, 3 Drawing Sheets

FLUID PRESSURE CONTROL VALVE AND A SYSTEM WHICH INCLUDES SUCH A VALVE

TECHNICAL FIELD & BACKGROUND ART

The present invention relates to a fluid pressure control valve and a fluid control system which includes such a valve. More particularly, the invention concerns fluid valves and systems in which it is intended that two different fluids of which both may be liquid, both may be gas or one gas and one liquid are to be supplied under pressure from separate pressurised sources and in which the pressure of one fluid is controlled in proportion to the pressure of the other fluid.

With many simple fluid control systems which employ relatively inexpensive components and two different fluid lines (the fluids from which may be intended to be introduced from one into the other in predetermined proportions and these proportions are related to the pressure under which the fluids are supplied to their respective lines) it is unlikely that the means for pressurising the respective fluids, such as an electrically driven pump or compressor, will provide constant pressure outputs for the fluids (albeit that the pressure of these outputs may be adjustable). It will be apparent that if the pressurising means for one of the fluids fluctuates in its pressure output as compared with that for the other fluid, the desired proportions in which the fluids may be introduced to each other will also fluctuate with possible undesirable consequences. This is particularly so for the dispensing of beverages such as beer, stout, lager, wine or so-called soft drinks where the beverage is supplied under pressure through one line to a dispensing tap while gas such as air, carbon dioxide or nitrogen is supplied under pressure through another line to be introduced into the beverage. The gas which is introduced may serve to form or to assist in the formation of a head on the beverage or to provide a sparkling or effervescent effect on the beverage as dispensed. In such dispensing systems the proportion of gas which is introduced should be maintained within a predetermined range for a given volume of the beverage as dispensed to ensure that neither too much gas is introduced which may result in the beverage having too great a head or effervescence or too little gas is introduced which may result in the bevrrage being "flat". It is an object of the present invention to provide a relatively inexpensive and simple fluid pressure control valve and a fluid control system by which the aforementioned undesirable features may be alleviated.

STATEMENT OF INVENTION AND ADVANTAGES

According to the present invention there is provided a fluid pressure control valve comprising discrete first and second passages, the second fluid passage having an exhaust port controlled by closure means having associated therewith biasing means which acts to normally close the exhaust port, the force exerted by the biasing means varying in response to displacement of sensing means which sensing means is displaceable in response to fluid pressure variations in the first passage whereby as fluid pressure in the first passage increases towards or above a predetermined value the sensing means is displaced to increase the biasing force on the closure means and as fluid pressure in the first passage decreases towards or below the predetermined value the sensing means is displaced to decrease the biasing force on the closure means and wherein means is provided for adjusting the sensing means to determine the predetermined pressure required in the first passage variations from which predetermined pressure causes the displacement of the sensing means.

More particularly, the invention provides a fluid pressure control valve comprising a first fluid passage; sensing means displaceably responsive to fluid pressure in the first passage; first biasing means for the sensing means and against which biasing means the sensing means reacts during its displacement in response to an increase in pressure in the first passage; adjustment means for adjusting the biasing applied by the first biasing means to the sensing means; a second fluid passage having an exhaust port; closure means controlling said exhaust port and displaceably responsive to fluid pressure in the second passage; second biasing means which biases the closure means to normally close the exhaust port and wherein the biasing exerted by the second biasing means is responsive to displacement of the sensing means whereby displacement of the sensing means in response to an increase in pressure in the first passage increases the biasing of the second biasing means to close the exhaust port and displacement of the sensing means in response to a decrease in pressure in the first passage decreases the biasing of the second biasing means to close the exhaust port.

Further according to the present invention there is provided a fluid control system having a fluid pressure control valve as specified in either of the two immediately preceding paragraphs and further comprising a first fluid source, first pressurising means for supplying the first fluid under pressure to the first passage; a second fluid source, second pressurising means for supplying the second fluid under pressure to the second passage and means by which one of the fluids emerging from its respective passage is introduced into the other fluid which emerges from its respective passage.

The present invention was primarily developed for beverage dispensing systems in which a beverage is to be dispensed under pressure through a liquid line and gas under pressure is injected into the beverage in that line to provide required and known characteristics for the beverage as dispensed; examples of such beverage dispensing systems are discussed in our British Patent Specifications Nos. 2,172,265A and 2,172,266A. For convenience the invention will hereinafter be discussed in relation to beverage dispensing although it will be appreciated that it is not intended to be so restricted and, as previously mentioned, may serve for controlling any combination of liquids and/or gases.

It is well known in the art of beverage dispensing, particularly fermented beverages such as stout and lager, that the quality and characteristics of the head which is formed on the beverage during dispensing is important to consumer satisfaction and as such the form of the head or froth should remain substantially constant for each dispensing. It is realised that for a given volume of beverage which is dispensed a predetermined volume of gas should be introduced into the beverage to achieve the required froth or head formation (assuming that the ambient conditions are maintained substantially constant). In known dispensing systems the beverage is supplied under pressure from an electric pump while the gas may be air supplied from a compressor, or carbon dioxide/nitrogen supplied through a pressure reducing valve from a bottle or ring-main. Generally the beverage pump is a relatively inexpensive component and is likely to provide fluctuations in the pressure of its beverage output. Consequently with a known dispensing system, such as that disclosed in our British Patent Specification No. 2,172,266A, if the pressure of the gas which is introduced into the beverage is maintained substantially constant so that the rate at which the gas is introduced into the beverage is predetermined on the basis of a given volume of the beverage being dispensed in a given time, it will be apparent that if, due to pressure fluctuations of the beverage pump, the beverage pressure increases (so that there is a consequential increase in the rate at which the beverage is dispensed) then the given volume of beverage will be dispensed faster and accordingly less gas will be introduced into that beverage with the result that an inadequate head or froth formation can develop and the beverage may be regarded as "flat". Conversely, if the pressure of the beverage reduces, again by fluctuations in its pump, the rate at which the beverage is dispensed will decrease so that for the given volume of beverage which is dispensed, a larger volume of gas will be introduced than that required with the result that the dispensed beverage may have too great a head or be too frothy.

To alleviate these disadvantages and by use of the present invention, the beverage derived under pressure from its pump communicates with the dispensing outlet by way of the first passage of the fluid pressure control valve while the gas under pressure is passed for injection into the beverage by way of the second fluid passage. The pressure source for the gas may have a coarse adjustment to control the gas pressure to be above that which would be required for introducing into the beverage while the sensing means on the control valve is adjusted to more finely control the pressure of the gas which is available to be admitted to the beverage under the ambient conditions which prevail. By adjusting the sensing means of the control valve, the biasing force on the closure means for the exhaust port will be varied whereby, during dispensing, a proportion of the gas in the second passage may normally vent through the exhaust port, usually to atmosphere in the case of air being introduced (or any other sink as appropriate for another gas or liquid which may be introduced). By the action of the control valve, if there is an increase in the beverage pressure above what may be regarded as normal for dispensing, the sensing means responds to this to increase the biasing on the closure means to reduce the proportion of gas which escapes through the exhaust port and thereby the pressure of gas which is available to be introduced into the beverage is increased with a consequential increase in the rate of such introduction to maintain, within an acceptable range, the required proportion of gas in the volume of beverage as dispensed. If there is a decrease in the beverage pressure below what may be regarded as normal for dispensing, the sensing means responds to this to decrease the biasing on the closure means to increase the proportion of gas which escapes through the exhaust port and thereby the pressure of gas which is available to be introduced into the beverage is reduced with a consequential reduction in the rate of such introduction, again to maintain, within an acceptable range, the required proportion of gas in the volume of beverage as dispensed.

The fluid pressure control valve may include temperature sensitive means which is responsive to the temperature of fluid in at least one of the passages and reacts upon a temperature variation from a predetermined condition to adjust the force exerted by the biasing means to close the exhaust port independently of the pressure of fluid within the passage or passages. At a typical beverage dispensing site the control valve will be adjusted for what may be regarded as a normal working temperature; however it is possible that the temperature of the beverage will vary between or during dispensing operations. It is recognised that if the temperature of the beverage increases above what may be regarded as a normal dispensing temperature, less gas has to be admitted into the beverage to achieve a required head or froth formation whereas if the temperature of the beverage decreases below that which is considered normal, a larger quantity of gas has to be introduced into the beverage to achieve the required head. With this in mind, the temperature sensitive means may be responsive to the temperature of beverage in the first passage and act on the biasing of the closure means for the exhaust port so that as the temperature of the beverage increases from what may be regarded as normal, the biasing force exerted on the closure means is decreased to permit a larger proportion of gas to escape through the exhaust port and thereby reduce the proportion of gas which is available to be introduced into the beverage. Conversely, as the temperature of the beverage decreases from the normal, the temperature sensitive means reacts so that the biasing force exerted on the closure means is increased to decrease the proportion of gas which escapes through the exhaust port (or possibly to fully close that port) and thereby increase the proportion of gas which is available to be introduced to the beverage.

The pressure control valve may include a facility for optionally and temporarily fully closing the exhaust port to ensure that maximum fluid pressure can be maintained in the second passage independently of the fluid pressure in the first passage and of any displacement of the sensing means. This facility may simply comprise a spring loaded manually displaceable plug or similar component which is moved to obturate the exhaust port as required. The facility to maintain a maximum fluid pressure in the second passage may prove useful for clearing blockages in the system downstream of the second passage. Desirably the gas under pressure from the second passage is injected into the beverage successively through a fixed orifice or capillary tube restrictor and a non-return valve in the manner disclosed in our British Patent Specification No. 2,172,266A. Should the aforementioned capillary tube or restrictor become blocked it may be possible to effect a clearance by applying full gas pressure through the line by temporarily closing the exhaust port in the manner mentioned. This temporary closure may also be useful in the event that a small quantity of the beverage is required to be dispensed with what may be regarded as an excessive head or froth formation.

The pressure control valve is preferably of a compact and unified structure which is conveniently incorporated in existing beverage dispensing systems and is preferably located close to the position in the system where the gas is introduced into the beverage and adjacent to a dispensing outlet which will often be in the form of a bar mounted dispensing tap. This location of the control valve in the vicinity of the dispensing tap is particularly preferred for convenience of access where there is a manual facility for optionally closing the exhaust port and/or where the valve includes the aforementioned temperature sensive means so that the response is to the temperature of the beverage shortly before it is dispensed.

DRAWINGS

One embodiment of a fluid pressure control valve constructed in accordance with the present invention and a beverage dispensing system incorporating such a valve will now be described, by way of example only, with reference to the accompanying illustrative drawings, in which:

FIG. 1 shows the valve in section;

FIG. 2 diagrammatically illustrates the valve of FIG. 1 in a typical beer dispensing system, and FIG. 3 is a similar section of the valve in FIG. 1 showing a modification to render the valve temperature sensitive.

DETAILED DESCRIPTION OF DRAWINGS

Figure 1:
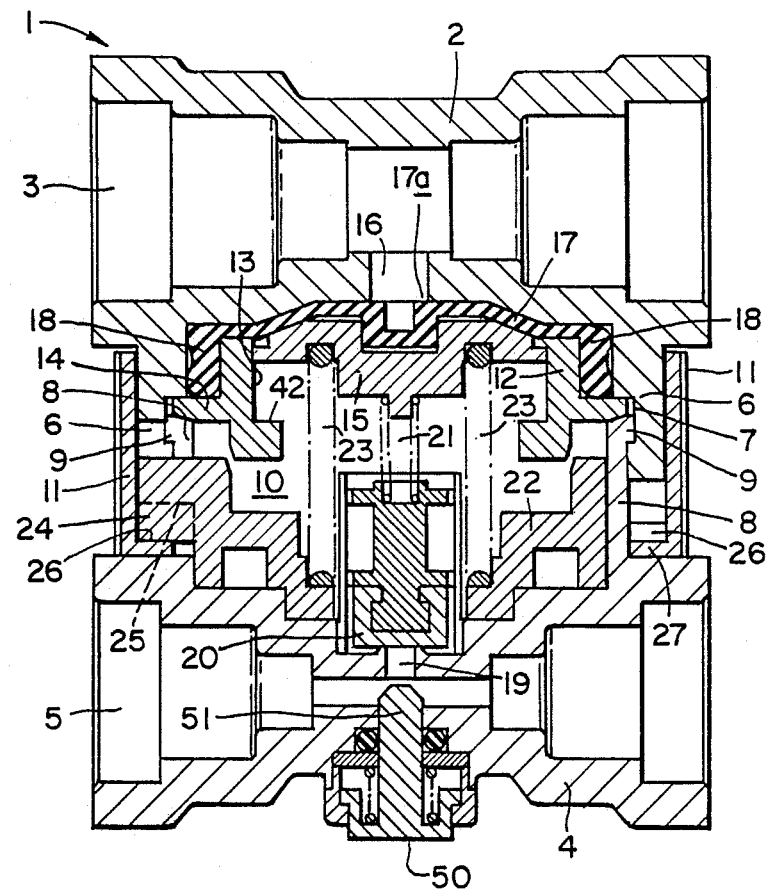

The control valve 1 shown in FIG. 1 is principally constructed of moulded plastics components and has a housing part 2 with a through passage 3 and a housing part 4 with a through passage 5. Formed on the housing part 2 is a generally annular skirt 6 with an internal annular recess 7. Formed on the housing part 4 is a generally annular skirt 8, the free end of which is provided with an external annular flange 9. The skirt 8 is coaxially received as a close sliding fit within the skirt 6 so that the flange 9 snap engages within the recess 7 to assemble a housing for the valve having a generally cylindrical valve chamber 10. Located on the exterior of the skirt 6 to be retained between the valve housing parts 2 and 4 upon assembly of the housing is a generally cylindrical adjustment sleeve 11 which is coaxial with the skirts 6 and 8 and rotatable relative thereto.

Located within the valve chamber 10 is an annular mounting 12 having a cylindrical bore 13. The mounting 12 has an external flange 14 which is received and clamped within the annular recess 7 by abutment with the flange 9 on the skirt 8 so that the mounting 12 is firmly retained within the chamber 10. Axially slidable within the cylinder 13 is a circular sensing member 15. Sandwiched between the housing part 2 and the sensing member 15 within the valve chamber 10 is a circular flexible seal or diaphragm 17 having a peripheral flange 18 which is sealed to the housing part 2, conveniently by clamping (and possibly adhesive) between the housing part 2 and the mounting 12. Located in the housing part 2 is a port 16 which is in constant communication between the passage 3 and a pressure chamber 17a formed between the diaphragm 17 and the adjacent wall of the housing part 2 which that diaphragm opposes.

Coaxial with the sensing member 15 and located in the housing part 4 is an exhaust port 19 which communicates, when open between the passage 5 and the valve chamber 10. The exhaust port 19 is controlled by a valve member 20 which is coaxial with the cylinder 13 and is axially displaceable within the chamber 10. A spring 21 reacting between the sensing member 15 and valve member 20 serves to bias the valve member 20 axially in a sense to normally close the exhaust port 19.

Also located within the valve chamber 10 and adjacent to the housing part 4 is a generally annular thrust member 22 coaxially through which the valve member 20 is displaceable. A spring 23 reacts between the thrust member 22 and the sensing member 15 to provide a biasing force on the sensing member 15 in a sense which urges the sensing member towards the port 16 and thereby the diaphragm 17 in a sense to contract the pressure chamber 17a. The thrust member 22 is axially displaceable within the chamber 10 and relative to the housing parts 2 and 4 and it will be apparent that such axial displacement will vary the compression of spring 23 and thereby the biasing force on the sensing member 15. The axial position of the thrust member 22 within the chamber 10 and thereby the biasing of the sensing member 15 is adjustable by a cam mechanism operated by manual rotation of the cylindrical sleeve 11 relative to the valve housing. For this purpose a radially outwardly extending flange part 24 of the thrust member 22 projects through appropriately located apertures or slots in the skirts 6 and 8 (which slots conveniently retain the member 22 from rotating within the chamber 10) and this flange part 24 has a circumferentially extending and inclined cam surface indicated at 25. The cam surface 25 is in sliding abutment with a cam follower surface 26 located on an internal flange 27 of the adjustment sleeve 11. With this arrangement, rotation of the adjustment sleeve 11 on the valve housing moves the cam follower surface 26 over the cam surface 25 of the thrust member 22 and thereby displaces the thrust member 22 axially within the chamber 10 to a desired position corresponding to a required biasing force being exerted on the sensing member 15 through the spring 23.

Figure 2:
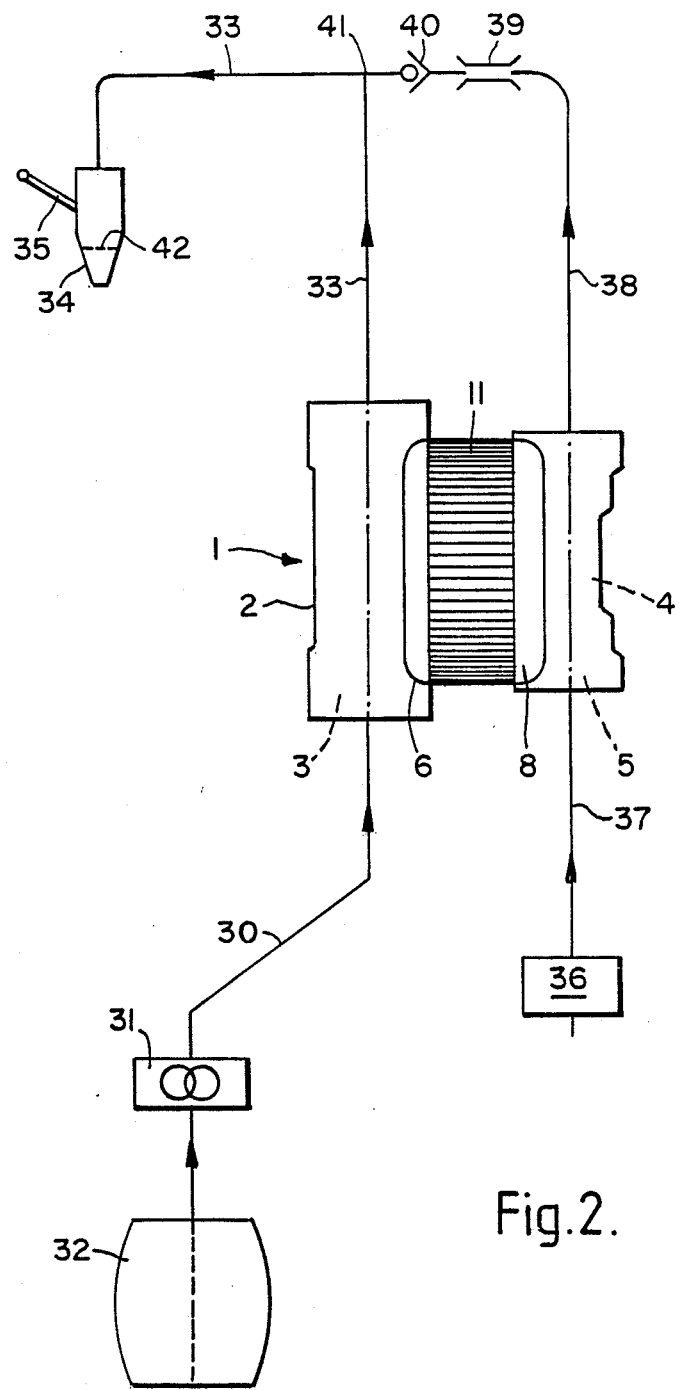

The use of the valve shown in FIG. 1 will now be considered in a beer dispensing system similar to that discussed in our British Patent Specifications Nos. 2,172,265A and 2,172,266A and shown generally in FIG. 2. The passage 3 is coupled in a beer line to receive beer under pressure through pipe 30 as supplied from an electrically driven pump 31, the beer being drawn by the pump from a cask 32. Beer flow through the passage 3 is carried by pipe 33 to a conventional nozzle type dispensing outlet 34 having an on/off dispensing tap 35. In the present embodiment air under pressure is to be injected into beer in the line 33 during dispensing and such air is drawn from atmosphere and supplied from a compressor 36 through an air line 37 to the valve passage 5. Air emerging from the passage is passed by way of a line 38 and succesively through a fixed orifice restrictor such as a capillary tube 39 and a non-return valve 40 to be injected at 41 into beer in the line 33. Usually the injection position 41 will be located in or adjacent to the dispensing tap 35. The air compressor 36 is adjustable to vary the air pressure supply while the restrictor 39 provides a pressure drop in that air supply for introduction through the non-return valve into the beer. Therefore, by a relatively coarse adjustment in the output pressure from the compressor 36 it is possible to control and determine, with reasonable efficiency, what may be regarded as a normal air pressure at the injection point 41 and thereby the rate at which air is to be introduced into the beer. For the purpose of promoting the development of a head of froth on the beer as dispensed the outlet 34 will usually be provided with cavitation means such as an apertured plate 42 through which beer having air (and possibly carbon dioxide which will often be present with the beer in the cask 32) in solution therewith passes to assist in the liberation of the gas in solution in conventional manner. Also in conventional manner the pump 31 and compressor 36 will be connected in the system to operate only in response to a dispensing demand, usually this operation will be controlled electrically by fluid pressure responsive switch devices.

The dispensing system will initially be set up for what may be regarded as normal dispensing under expected ambient conditions where the pump provides a normal pressure beer output to give a desired or normal rate of beer delivery from the outlet 34 and the compressor 36 is adjusted for the air pressure to give a desired or normal rate at which air is to be introduced into normal beer delivery. To achieve this "normal" initial set up, the air pressure in the passage 5 of the valve 1 will likely be sufficient to lift the valve member 20 against its spring biasing 21 so that a proportion of the air escapes from the air line by way of the exhaust port 19 to atmosphere and this is taken into consideration during the initial setting up procedure while beer is being dispensed. In addition, when beer is being dispensed, the pressure of beer in the passage 3 of the valve 1 will react through the port 16 and in the pressure chamber 17a in a sense to expand that chamber and thereby displace the diaphragm and sensing member 15 downwardly in FIG. 1 against the spring loading 23—this displacement of the sensing member 15 will naturally increase the force exerted by the spring loading 21 on the valve member 20 and again this is taken into consideration in initial setting up of the system. To achieve a required balance between partial expansion of the pressure chamber 17a (and thereby the biasing force of spring 21) and the biasing force of spring 23, the axial position of the thrust member 22 can be adjusted by rotation of the adjustment sleeve 11 as previously discussed.

Following a dispensing operation when the dispensing tap is closed, the pressure in the beer line 30, 3 and 33 will rapidly rise to a maximum as determined by the pump 31 (usually this maximum pressure serves to operate a pressure sensitive switch which switches off the pump and compressor) and the maximum pressure in the passage 3 when applied to the diaphragm 17 may expand the pressure chamber 17a to a maximum (where the sensing member 15 is displaced fully against the spring loading 23 to abut an end stop provided by an internal radial flange 42 on the mounting 12). In this latter position the spring 21 provides a maximum biasing force to urge the valve member 20 to close the exhaust port 19.

Unless expensive pumps are employed, it is likely that the pressure performance of the pump 31 will vary during its use so that the beer pressure supply to the line 30 will fluctuate (possibly due to the characteristics of the pump, variations in the conditions under which the beer is stored in the keg, variations in the electrical supply or otherwise). Obviously the system is initially set up for beer dispensing with a pressure output from the pump which is regarded as that which is to be expected as being normal (albeit that this normal pressure may be adjustable for setting up purposes). With a normal system as set up, the pump 31 will deliver beer under pressure at a normal flow rate to be dispensed while the compressor 36 will also provide air under pressure to be introduced at a normal flow rate as is required for the normal rate of beer flow.

With the system shown in FIG. 2, and in the absence of the control valve 11, it will be apparent that if the beer pressure from pump 31 fluctuates to increase above the normal, there will be a corresponding increase in the rate of beer flow while the air which is introduced into the beer will be maintained at its normal rate—consequently a given volume of beer as dispensed will have less air introduced thereto than that considered normal with the result that a less than normal head or froth will be developed and the dispensed beer may be regarded as flat. Conversely, if the beer pressure from the pump 31 fluctuates to decrease below the normal, there will be a corresponding decrease in the rate of beer flow while the air which is introduced into the beer will be maintained at its normal rate—consequently a given volume of beer as dispensed will have more air introduced thereto than that considered normal with the result that a more than normal head or froth will be developed and the dispensed beer may be too frothy. However, by incorporating in the system the control valve 1, it will be seen from FIG. 1 that if the beer pressure increases beyond the norm during dispensing, the increase in pressure reacts on the diaphragm 17 through the port 16 and in the pressure chamber 17a to displace the sensing member 15 downwardly in the drawing against its spring biasing and thereby increase the biasing of spring 21 to urge the valve member 20 into closure with the exhaust port 19. As a consequence the proportion of air escaping to atmosphere through the exhaust port is reduced so that the corresponding increase in air pressure in the line 38 increases the rate at which air is introduced into the beer which is being dispensed and thereby the desired proportion of beer-/air can, within an acceptable range, be maintained for the beer as dispensed. Conversely, if the beer pressure in the line 30 decreases from the normal during dispensing, this reduction in pressure is again sensed within the pressure chamber 17a through the port 16 to cause that chamber to contract and thereby the sensing member 15 to be displaced upwardly in FIG. 1 under the action of its biasing spring 23. The biasing force of spring 21 on the valve member 20 is thereby reduced to permit a larger proportion of air under pressure to escape to atmosphere from the passage 5 through the exhaust port 19—this decreases the air pressure in line 38 and thereby the rate at which air is introduced into the beer which is being dispensed so that the desired proportion of beer-/air can be maintained, within an acceptable range, for the beer as dispensed.

As an optional feature on the control valve 1, there is shown in FIG. 1 a button 50 which is spring loaded on the housing part 4 and has a plunger 51 which extends into the air line passage 5 coaxially with the exhaust port 19. The plunger 51 is normally maintained by its spring loading clear of the exhaust port 19, however the button and plunger can be manually displaced against its spring loading for the plunger to close the exhaust port 19. The effect of this is that maximum available air pressure from the compressor 36 is supplied to the air line 38. This maximum air pressure supply can conveniently serve to "blow-through" and clear obstructions which may develop in the restrictor 39 or non-return valve 40 and also to provide a maximum introduction of air into the beer 33 during a dispensing operation in the event that excessive froth or foam is required.

It is recognised in the dispensing of beer or other beverage that the quantity of gas which it is necessary to introduce into the beverage to achieve a required or normal head of froth or foam will vary according to the prevailing beer temperature. In many beer dispensing systems precautions are therefore taken to maintain the beer and the system at a substantially constant temperature at which the system is set up for normal dispensing. However, should the beer temperature decrease below its norm, it is found that a larger proportion of air or other gas has to be introduced to achieve the required head or froth whereas if the beer temperature increases above its norm, a smaller amount of air or other gas is to be introduced to achieve the required head—having this in mind the control valve shown in FIG. 1 can be modified as shown in FIG. 3 to render it appropriately sensitive and compensate for variations in the temperature of beer in the passage 3.

Figure 3:
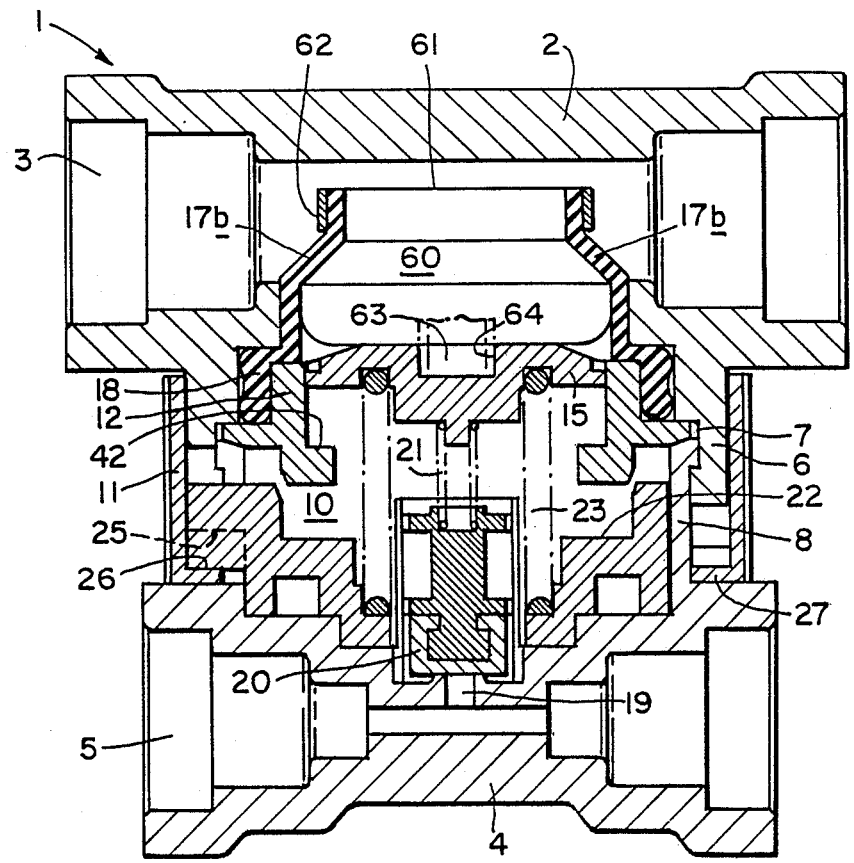

In FIG. 3 the diaphragm 17 is sealed to the housing part 2 in a similar manner to that previously discussed but is of annular, generally bell-shaped, tubular form as shown at 17b to project through the wall of the housing part 2 into the passage 3. Mounted within the diaphragm 17b is a temperature sensitive unit 60 having a face 61 which is exposed to beer in the passage 3. The diaphragm 17b is clamped and sealed on the unit 60 by an annular band 62 so that as the diaphragm 17b is displaced in response to variations in beer pressure in the passage 3, the unit 60 will be displaced in unison therewith and coaxially with the sensing member 15. The temperature sensitive unit 60 is expandible and contractible axially in response to temperature variations in the passage 3 and includes a spigot 63 which engages in a socket 64 in and coaxially with the sensing member 15. The spigot 63 axially withdraws or contracts into the unit 60 as the temperature sensed by that unit increases and axially extends or expands further from the unit 60 as the temperature sensed by that unit decreases. In the condition of FIG. 3 the spigot 63 is shown fully withdrawn into the unit 60 corresponding to a relatively high temperature of beer being sensed in the passage 3. It will be apparent that as the unit 60 senses different temperatures within the passage 3, the effective contraction or extension of the spigot 63 on the unit will decrease or increase respectively the effective axial length of the sensing unit between the clamping band 62 and the sensing member 15 so that the axial reaction of the sensing unit against the restraint of the diaphragm 17b will cause the sensing member 15 to be displaced axially under its spring loading 23 or against its spring loading 23. This latter displacement will, of course, vary the biasing force of the spring 21 on the closure member 20 independently of the beer pressure in the passage 3. The valve shown in FIG. 3 will be set up for normal dispensing and with the temperature sensing unit 60 arranged so that for a desired temperature of the beer which may be regarded as normal, the spigot 63 is partially extended on the unit 60 between its maximum and minimum temperature sensing conditions. Under these normal conditions the valve unit of FIG. 3 will operate in a similar manner to that discussed for FIG. 1 so that pressure fluctuations in the beer passage 3 are sensed on the member 15 by a reaction through axial displacement of the unit 60 and spigot 63 to vary the pressure biasing of spring 21 on the valve member 20. In the event that the temperature of beer in passage 3 falls below the norm, the spigot 63 moves axially to project further on the unit 60 and increase the biasing force on the valve member 20 to urge that member against the exhaust port 19. As a consequence less air can escape through the exhaust port 19 and a relatively larger proportion of air is provided to be introduced to compensate for the relative decrease in the temperature of beer. Conversely if the temperature of beer increases above the norm the spigot 63 withdraws into the unit 60 to decrease the biasing force on the valve member 20 so that a larger proportion of air from the passage 5 can pass through the exhaust port 19 to atmosphere and thereby a relatively smaller proportion of air is provided to be introduced to compensate for the relative increase in the temperature of the beer.

We claim:

1. A fluid pressure control valve comprising discrete first and second passages, the second fluid passage having an exhaust port controlled by closure means having associated therewith biasing means which acts to normally close the exhaust port, the force exerted by the biasing means varying in response to displacement of sensing means which sensing means is displaceable in response to fluid pressure variations in the first passage whereby as fluid pressure in the first passage increases towards or above a predetermined value the sensing means is displaced to increase the biasing force on the closure means and as fluid pressure in the first passage decreases towards or below the predetermined value the sensing means is displaced to decrease the biasing force on the closure means and wherein means is provided for adjusting the sensing means to determine the predetermined pressure required in the first passage variations from which predetermined pressure causes the displacement of the sensing means.

2. A fluid pressure control valve comprising a first fluid passage; sensing means displaceably responsive to fluid pressure in the first passage; first biasing means for the sensing means and against which biasing means the sensing means reacts during its displacement in response to an increase in pressure in the first passage; adjustment means for adjusting the biasing applied by the first biasing means to the sensing means; a second fluid passage having an exhaust port; closure means controlling said exhaust port and displaceably responsive to fluid pressure in the second passage; second biasing means which biases the closure means to normally close the exhaust port and wherein the biasing exerted by the second biasing means is responsive to displacement of the sensing means whereby displacement of the sensing means in response to an increase in pressure in the first passage increases the biasing of the second biasing means to close the exhaust port and displacement of the sensing means in response to a decrease in pressure in the first passage decreases the biasing of the second biasing means to close the exhaust port.

3. A valve as claimed in claim 2 in which the sensing means comprises a sensing member displaceable in a valve housing and the adjustment means comprises a thrust member between which and the sensing member the first biasing means reacts and said thrust member is displaceable in the valve housing to adjust the biasing force of the first biasing means.

4. A valve as claimed in claim 3 in which a flexible diaphragm in sealed engagement with the valve housing is provided between the sensing member and the first passage and through which diaphragm fluid pressure variations in the first passage are sensed by the sensing member.

5. A valve as claimed in claim 2 in which the closure means comprises a displaceable valve member and the second biasing means reacts between said valve member and the sensing means to bias the valve member to close the exhaust port.

6. A valve as claimed in claim 3 in which the closure means comprises a displaceable valve member and the second biasing means reacts between said valve member and the sensing means to bias the valve member to close the exhaust port; the sensing member, thrust member and valve member are axially displaceable and substantially coaxially mounted in the valve housing and the first biasing means comprises first spring means reacting between the sensing member and the thrust member and the second biasing means comprises second spring means reacting between the sensing member and the valve member.

7. A valve as claimed in claim 6 in which the thrust member is generally annular in form and said valve member is located to be axially displaceable within and relative to the annular form of the thrust member.

8. A valve as claimed in claim 2 in which the first and second passages are formed in the or a valve housing and said housing forms a valve chamber within which are located the sensing means, the first biasing means, the adjustment means, the closure means and the second biasing means.

9. A valve as claimed in claim 8 in which the valve housing comprises a first housing part having the first fluid passage and a second housing part having the second fluid passage, each of said housing parts having a skirt extending therefrom and wherein said skirts engage one with the other to form the valve chamber.

10. A valve as claimed in claim 9 in which the skirts are substantially cylindrical and snap engage one within the other to form the valve chamber.

11. A valve as claimed in claim 9 in which the skirts are substantially cylindrical and engage to form a substantially cylindrical valve chamber substantially coaxial with the sensing means, adjustment means and closure means.

12. A valve as claimed in claim 2 in which the adjustment means comprises the or a thrust member displaceable in the or a valve housing, and wherein said thrust member is adjustable within the housing to adjust the biasing force of the first biasing means by a manually operable cam mechanism.

13. A valve as claimed in claim 12 in which the thrust member is axially displaceable in a generally cylindrical valve housing portion and said cam mechanism comprises an adjustment sleeve concentrically mounted on said valve housing portion and which sleeve is rotatable on the valve housing portion to operate the cam mechanism.

14. A valve as claimed in claim 2 and comprising temperature sensitive means which is responsive to the temperature of fluid in at least one of the first and second passages and reacts upon a temperature variation from a predetermined condition and independently of fluid pressure in said passages to adjust the force exerted by the biasing means on the closure means.

15. A valve as claimed in claim 14 in which the temperature sensing means is responsive to the temperature of fluid in the first fluid passage and in response to an increase in temperature of said fluid towards and above the predetermined temperature condition reacts to decrease the force exerted by the biasing means on the closure means and in response to a decrease in temperature of said fluid towards and below said predetermined temperature condition reacts to increase the force exerted by the biasing means on the closure means.

16. A valve as claimed in claim 15 in which the temperature sensing means comprises a unit which is restrained to be displaceable in response to pressure fluctuations in the first passage and said displacement of the unit imparts displacement to the sensing means against or under the first biasing means and said unit is expanded or contracted in response to temperature variations of fluid in the first passage and said expansion or contraction reacts against the restraint of the unit to displace the sensing means independently of pressure variations in the first passage to vary the biasing force exerted on the closure means.

17. A valve as claimed in claim 16 in which the temperature sensing unit is restrained and carried by the or a diaphragm which is sealed to the or a valve housing and is displaceable in response to pressure variations in the first passage to displace the sensing means.

18. A valve as claimed in claim 2 and comprising means for optionally and temporarily maintaining the exhaust port closed.

19. A valve as claimed in claim 18 in which the exhaust port can temporarily be maintained closed by a plunger which is manually displaceable to obturate that port.

20. A valve as claimed in claim 2 in which the exhaust port when opened by the closure means provides communication between the second fluid passage and atmosphere.

21. A fluid control system having a fluid pressure control valve as claimed in claim 1 and further comprising a first fluid source, first pressurising means for supplying the first fluid under pressure to the first passage; a second fluid source, second pressurising means for supplying the second fluid under pressure to the second passage and means by which one of the fluids from its respective passage is introduced into the other fluid from its respective passage.

22. A system as claimed in claim 21 in which the first fluid is liquid and the second fluid is gas and said gas is introduced into the liquid by way of a non-return valve.

23. A system as claimed in claim 22 in which the first pressurising means comprises an electrically controlled pump.

24. A system as claimed in claim 22 in which the gas is introduced into the liquid by way of a fixed orifice restrictor and the non-return valve successively and the second pressurising means is adjustable to change the gas pressure supplied to the second passage.

25. A system as claimed in claim 22 in which the liquid is beverage and the gas comprises at least one of air, nitrogen and carbon dioxide gases.

26. A system as claimed in claim 25 in which the air is drawn from atmosphere and supplied to the second passage by a compressor.

* * * * *